United States Patent
Miyano

(10) Patent No.: US 12,340,575 B2
(45) Date of Patent: Jun. 24, 2025

(54) VEHICLE DETECTING SYSTEM, VEHICLE DETECTING METHOD, AND PROGRAM STORAGE MEDIUM

(71) Applicant: NEC Corporation, Tokyo (JP)

(72) Inventor: Hiroyoshi Miyano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/236,772

(22) Filed: Aug. 22, 2023

(65) Prior Publication Data
US 2023/0394809 A1    Dec. 7, 2023

Related U.S. Application Data

(63) Continuation of application No. 18/139,111, filed on Apr. 25, 2023, which is a continuation of application
(Continued)

(30) Foreign Application Priority Data

Jun. 3, 2014  (JP) .................................. 2014-115205

(51) Int. Cl.
*G06V 10/82* (2022.01)
*G06T 7/215* (2017.01)
(Continued)

(52) U.S. Cl.
CPC ............. *G06V 10/82* (2022.01); *G06T 7/215* (2017.01); *G06T 7/251* (2017.01); *G06T 7/70* (2017.01);
(Continued)

(58) Field of Classification Search
CPC ........ G06V 10/82; G06V 10/28; G06V 20/52; G06T 7/215; G06T 7/251; G06T 7/70;
(Continued)

(56) References Cited

U.S. PATENT DOCUMENTS 6,128,396 A    10/2000  Hasegawa et al.
6,324,532 B1 *  11/2001  Spence ............. G06F 18/24155
                                                 706/19
(Continued)

FOREIGN PATENT DOCUMENTS

JP    H10-285581 A    10/1998
JP    2004-180259 A    6/2004
(Continued)

OTHER PUBLICATIONS

X. Bai and G. Sapiro, "A Geodesic Framework for Fast Interactive Image and Video Segmentation and Matting," 2007 IEEE 11th International Conference on Computer Vision, Rio de Janeiro, Brazil, 2007, pp. 1-8, doi: 10.1109/ICCV.2007.4408931. (Year: 2003).*

(Continued)

*Primary Examiner* — Andrae S Allison
(74) *Attorney, Agent, or Firm* — Sughrue Mion, PLLC

(57) ABSTRACT

Provided is an image processing system, an image processing method, and a program for preferably detecting a mobile object. The image processing system includes: an image input unit for receiving an input for some image frames having different times in a plurality of image frames constituting a picture, which is of a pixel on which the mobile object appears or a pixel on which the mobile object does not appear, for selected arbitrary one or more pixels in an image frame at the time of processing; and a mobile object detection model constructing unit for learning a parameter for detecting the mobile object based on the input.

12 Claims, 10 Drawing Sheets

Related U.S. Application Data

No. 16/289,745, filed on Mar. 1, 2019, now abandoned, which is a continuation of application No. 15/314,572, filed as application No. PCT/JP2015/002768 on Jun. 2, 2015, now Pat. No. 11,003,961.

(51) Int. Cl.

| | |
|---|---|
| *G06T 7/246* | (2017.01) |
| *G06T 7/70* | (2017.01) |
| *G06V 10/28* | (2022.01) |
| *G06V 20/52* | (2022.01) |
| *H04N 7/18* | (2006.01) |

(52) U.S. Cl.
CPC .............. *G06V 10/28* (2022.01); *G06V 20/52* (2022.01); *H04N 7/18* (2013.01); *G06T 2207/10016* (2013.01); *G06T 2207/10024* (2013.01); *G06T 2207/20076* (2013.01); *G06T 2207/20081* (2013.01); *G06T 2207/30196* (2013.01); *G06T 2207/30232* (2013.01)

(58) Field of Classification Search
CPC . G06T 2207/10016; G06T 2207/10024; G06T 2207/20076; G06T 2207/20081; G06T 2207/30196; G06T 2207/30232; G06T 2207/20084; H04N 7/18
See application file for complete search history.

(56) References Cited

U.S. PATENT DOCUMENTS

| | | | |
|---|---|---|---|
| 7,295,700 | B2 | 11/2007 | Schiller et al. |
| 7,813,528 | B2 | 10/2010 | Porikli et al. |
| 8,891,864 | B2 | 11/2014 | Pettigrew et al. |
| 9,292,929 | B2 | 3/2016 | Hayata |
| 10,192,129 | B2 | 1/2019 | Price et al. |
| 10,540,771 | B2 | 1/2020 | Chefd'hotel et al. |
| 10,586,102 | B2 | 3/2020 | Ren et al. |
| 2004/0125115 | A1 | 7/2004 | Takeshima et al. |
| 2004/0202368 | A1* | 10/2004 | Lee ........................ G06T 7/143 382/173 |
| 2005/0089216 | A1* | 4/2005 | Schiller .................. G06V 10/56 382/165 |
| 2008/0247599 | A1* | 10/2008 | Porikli .................... G06V 20/52 382/103 |
| 2009/0097709 | A1 | 4/2009 | Tsukamoto |
| 2010/0119147 | A1* | 5/2010 | Blake ...................... G06T 7/143 382/164 |
| 2010/0272363 | A1 | 10/2010 | Steinberg et al. |
| 2011/0170769 | A1 | 7/2011 | Sakimura et al. |
| 2011/0216976 | A1* | 9/2011 | Rother ...................... G06T 7/11 382/173 |
| 2011/0293247 | A1 | 12/2011 | Bhagavathy et al. |
| 2012/0210274 | A1 | 8/2012 | Pettigrew et al. |
| 2012/0263346 | A1* | 10/2012 | Datta ...................... G06V 10/44 382/103 |
| 2012/0288153 | A1 | 11/2012 | Tojo et al. |
| 2013/0050502 | A1 | 2/2013 | Saito et al. |
| 2013/0071032 | A1* | 3/2013 | Nishino .................. G06V 10/28 382/195 |
| 2013/0084006 | A1 | 4/2013 | Zhang et al. |
| 2013/0155229 | A1 | 6/2013 | Thornton et al. |
| 2013/0342705 | A1* | 12/2013 | Huang .................... G06T 7/254 348/169 |
| 2014/0078170 | A1 | 3/2014 | Ohki |
| 2014/0205141 | A1 | 7/2014 | Gao et al. |
| 2014/0226052 | A1 | 8/2014 | Kang et al. |
| 2014/0355882 | A1 | 12/2014 | Hayata |
| 2015/0063689 | A1 | 3/2015 | Datta et al. |
| 2016/0209927 | A1 | 7/2016 | Yamagishi et al. |
| 2016/0328856 | A1 | 11/2016 | Mannino et al. |
| 2017/0140236 | A1 | 5/2017 | Price et al. |
| 2017/0344860 | A1 | 11/2017 | Sachs et al. |
| 2018/0357472 | A1 | 12/2018 | Dreessen |
| 2019/0236394 | A1 | 8/2019 | Price et al. |
| 2020/0202533 | A1 | 6/2020 | Cohen et al. |
| 2021/0027083 | A1 | 1/2021 | Cohen et al. |
| 2023/0177824 | A1 | 6/2023 | Price et al. |

FOREIGN PATENT DOCUMENTS

| | | | |
|---|---|---|---|
| JP | 2008-092471 | A | 4/2008 |
| JP | 2008-257693 | A | 10/2008 |
| JP | 2011-059898 | A | 3/2011 |
| JP | 2011-145791 | A | 7/2011 |
| JP | 2012-059224 | A | 3/2012 |
| JP | 2012104872 | A | 5/2012 |
| JP | 2012-517647 | A | 8/2012 |
| JP | 5058010 | A | 10/2012 |
| JP | 2012-257173 | A | 12/2012 |
| JP | 2013-58063 | A | 3/2013 |
| JP | 2013-065151 | A | 4/2013 |
| JP | 2013-125529 | A | 6/2013 |
| JP | 2014-059691 | A | 4/2014 |

OTHER PUBLICATIONS

Xu, Pei, et al. "Dynamic background learning through deep auto-encoder networks." Proceedings of the 22nd ACM international conference on Multimedia. 2014. (Year: 2014).*
Akihiro Matsuda et al., "Automatic Extraction of Moving Object from Video Frames by Graph Cut", The Institute of Electronics, Information and Communication Engineers, IEICE Technical Report, Jan. 14, 2010, Japan, vol. 109, No. 376, pp. 13-18 (6 pages total).
Communication dated May 28, 2019, from the Japanese Patent Office in counterpart Application No. 2016-525694.
Bai, Xue, et al., "A Geodesic Framework for Fast Interactive Image and Video Segmentation and Matting", Dec. 26, 2007, 8 pages, IEEE Xplore, USA (Year:2007).
Japanese Office Action for JP Application No. 2020-209692 mailed on Dec. 21.2021 with English translation.
Dan Ring et al., "Feature-Cut: Video object segmentation through local feature correspondences". 2009 IEEE 12th International Conference on Computer Vision Workshops. ICCV Workshops, USA, IEEE. Sep. 27, 2009, pp. 617-624.
Xue Bai et al., "Distancecut: Interactive Segmentation and Matting of images and Videos", 2007 IEEE international Conference on Image Processing, USA, IEEE, Sep. 16, 2007, pp. 249-252.
Satomi Kudo et al., "Accuracy Enhancement in Automatic Video Segmentation based on Graph-Cut using the SURF features". IE1CE Technical Report, Japan, The Institute of Electronics, information and Communication Engineers, Nov. 17, 2011, vol. 111, No. 317, pp. 141-146.
Packt Video, OpenCV Tutorial: Segmenting an Image Using the Grabcut Algorithm, Screen shot 0.41s https://www.youtube.com/watch?v=aOqOwM-Qb&t=31s, 2013 (Year: 2013).
US Notice of Allowance for U.S. Appl. No. 15/314,572 mailed on Jan. 22, 2021.
Yang et al. "Semi-supervised Learning of Feature Hierarchies for Object Detection in a Video", pp. 1650-1657.
Nikolaos Doulamis et al. "Semi-supervised deep learning for object tracking and classification." 2014 IEEE International Conference on Image Processing (ICIP). IEEE, 2014.
US Office Action for U.S. Appl. No. 15/314,572 mailed on Aug. 7, 2020.
Japanese Office Action for JP Application No. 2019-105217 mailed on Nov. 17, 2020 with English Translation.
Jiani Wang et al., "Study on the Creation of a Scenery Category Map using Geo-tagged Photographic Images", Technical Report of IEICE, The Institute of Electronics, Information and Communication Engineers, Oct. 14, 2010, /ol. 110, No. 238, pp. 1-6 (corresponds to the Reference books and magazines, pp. 79-84, in Japanese Office Action nailed on Nov. 17, 2020), Japan.
Japanese Office Action for JP Application No. 2019-105217 mailed on Sep. 15, 2020 with English Translation.

(56) References Cited

OTHER PUBLICATIONS

Atsushi Kawabata, Shinya Tanifuji, Yasuo Morooka, An Image Extraction Method for Moving Object, Information Processing Society of Japan, vol. 28, No. 4, pp. 395-402, 1987.
C. Stauffer and W.E.L. Crimson, "Adaptive background mixture models for real-time tracking". Proceedings of CVPR, The Artificial Intelligence Laboratory, Massachusetts Institute of Technology, Cambridge, MA, USA vol. 2, pp. 246-252, 1999.
International Search Report for PCT Application No. PCT/JP2015/002768, mailed on Aug. 11, 2015.
English translation of Written opinion for PCT Application No. PCT/JP2015/002768.
US Office Action for U.S. Appl. No. 15/314,572 mailed on Sep. 19, 2019.
US Office Action for U.S. Appl. No. 15/314,572 on Jun. 19, 2019.
US Office Action for U.S. Appl. No. 15/314,572 mailed on Mar. 8, 2019.
Japanese Office Action for JP Application No. 2019-105217 mailed on Jul. 7, 2020 with English Translation.
Communication dated Apr. 25, 2023 issued by the Japanese Intellectual Property Office in counterpart Japanese Application No. 2022-091955.
Minglun Gong et al., "Foreground Segmentation of Live Videos using Locally Competing 1SVMs", IEEE Conference on Computer Vision and Pattern Recognition (CVPR) 2011, IEEE, Jun. 20, 2011, 8 pages total.
Weiwei Du et al., "Image and Video Matting by Membership Propagation", IEICE Technical Report, Institute of Electronics, vol. 106, No. 428, Dec. 2006, 9 pages total.
JP Office Action for JP Application No. 2022-091955, mailed on Jul. 4, 2023 with English Translation.
Christoph Sommer et al.,"Machine learning in cell biology-teaching computers to recognize phenotypes", Journal of Cell Science, United Kingdom, The Company of Biologists Ltd, Dec. 15, 2013, vol. 126, No. 24, pp. 5529-5539.
US Office Action for U.S. Appl. No. 18/139,111, mailed on Sep. 25, 2024.
Xu, Ning, et al. "Deep interactive object selection". Proceedings of the IEEE conference on computer vision and pattern recognition. 2016. (Year: 2016).
Liu, Ziwei, et al. "Semantic image segmentation via deep parsing network". Proceedings of the IEEE international conference on computer vision. 2015. (Year: 2015).
US Office Action for U.S. Appl. No. 18/236,747, mailed on Sep. 26, 2024.
Visvanathan Ramesh et al., "Background Modeling and Subtraction of Dynamic Scenes", Proceedings ninth IEEE International Conference on Computer Vision (ICCV'03), IEEE, 2003. (Year: 2003).

* cited by examiner

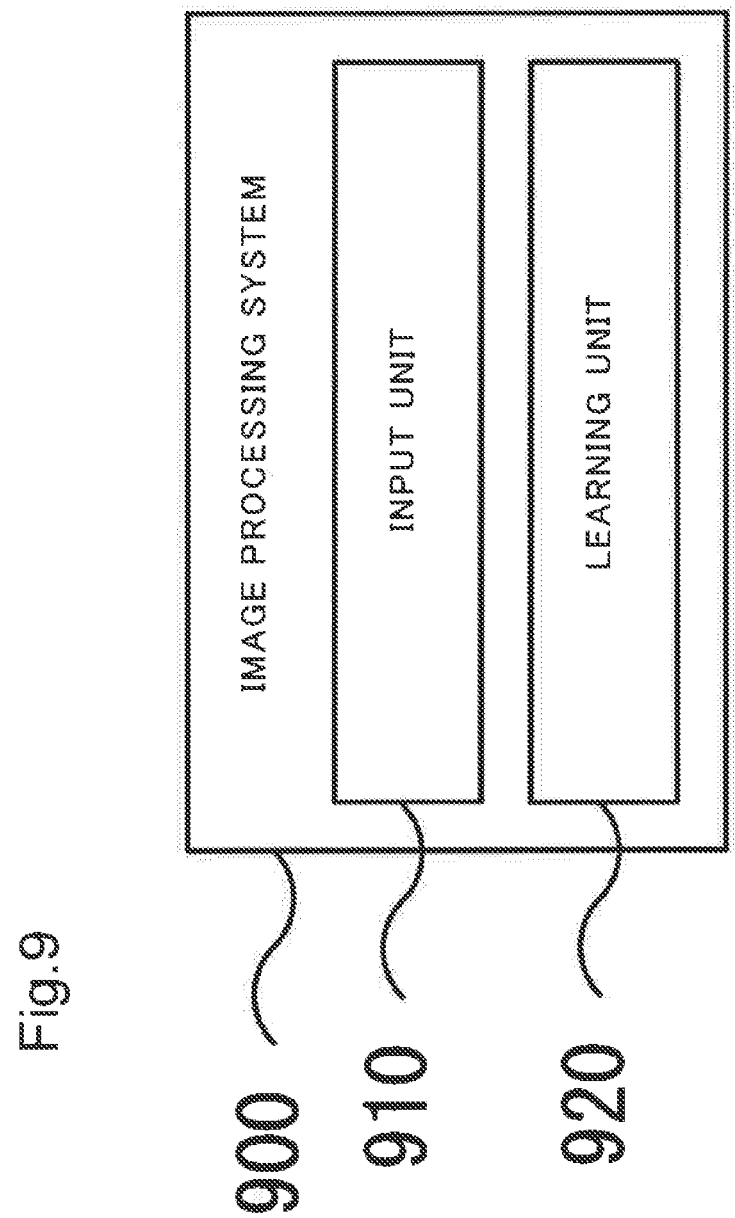

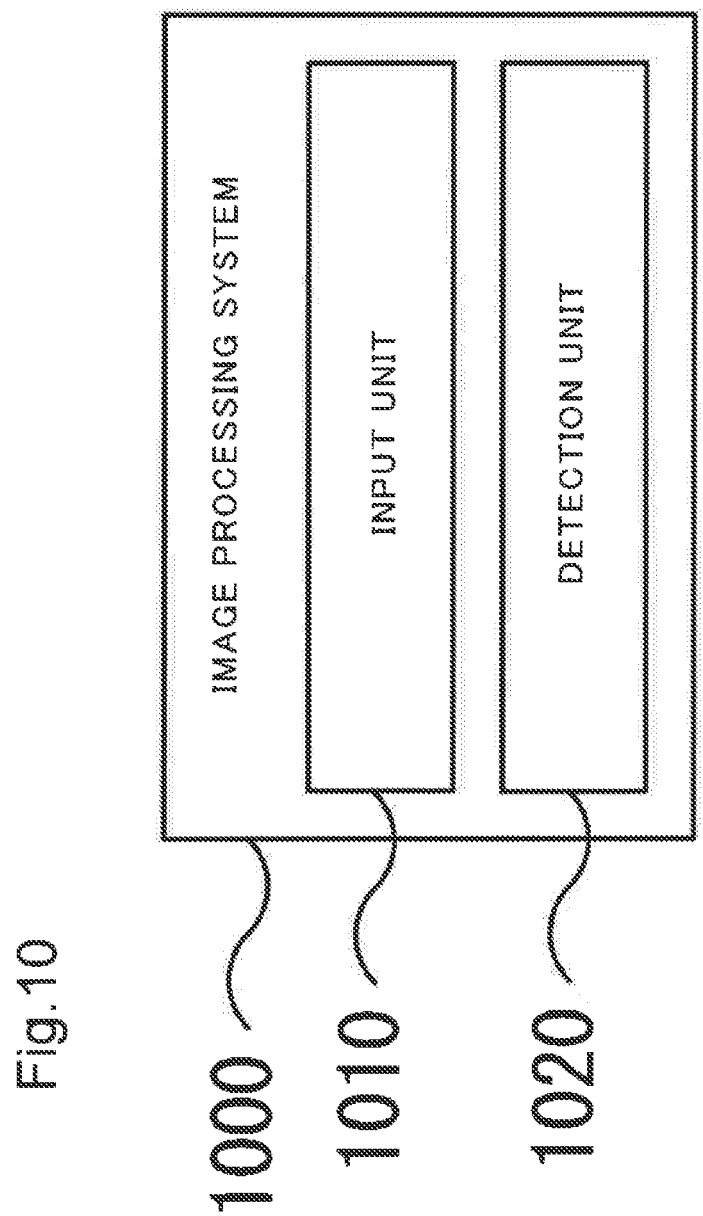

VEHICLE DETECTING SYSTEM, VEHICLE DETECTING METHOD, AND PROGRAM STORAGE MEDIUM

The present application is a Continuation application of Ser. No. 18/139,111 filed on Apr. 25, 2023, which is a Continuation application of Ser. No. 16/289,745 filed on Mar. 1, 2019, which is a Continuation application of Ser. No. 15/314,572 filed on Nov. 29, 2016, which issued as U.S. Pat. No. 11,003,961, which is a National Stage Entry of PCT/JP2015/002768 filed on Jun. 2, 2015, which claims priority from Japanese Patent Application 2014-115205 filed on Jun. 3, 2014, the contents of all of which are incorporated herein by reference, in their entirety.

TECHNICAL FIELD

Some aspects of the present invention relate to an image processing system, an image processing method, and a program storage medium.

BACKGROUND ART

In recent years, in the application of video surveillance or the like, needs for detecting and tracking a mobile object such as a person or a vehicle are increasing. With such increasing needs, many techniques for detecting the mobile object and tracking the detected mobile object have been proposed. A mobile object herein is not limited to an object which continues to move among objects appeared on an image, and also includes an object which "temporarily stops" (also referred to as "rests" or "loiters"). In other words, a mobile object generally means an object appeared on an image except a portion regarded as a background. For example, a person or a vehicle which is a common target to be monitored by video surveillance is moving not all the time, but has a state of resting such as temporarily stopping or parking. For this reason, it is important in applications such as video surveillance that an object can be detected even when the object temporarily stops.

As a method of detecting the mobile object, the background difference method is known (see, for example, Non Patent Literature 1 and Non Patent Literature 2). The background difference method is a method in which an image stored as the background is compared with an image captured by a camera to extract a region having a difference as the mobile object. Here, when the mobile object is detected by using a background difference, an accurate background extraction is required at the time of analysis. This is because, when data at the start of measurement is simply used as a background fixedly, many error detections occur, caused by influence of a change of the background due to an environmental change such as a change of illumination. Accordingly, in order to avoid such problems, usually, a background at the time of analysis is performed by a method such as calculating a mean value for each pixel from images observed within the latest time period. For example, Non Patent Literature 1 discloses a method of applying the background difference method while performing an update of the background successively.

On the other hand, there is also a technique in which only an object which temporarily rests such as a left object or a person who loiters for a predetermined time is extracted (see, for example, Patent Literature 1). Patent Literature 1 discloses a method in which a motion in a scene is analyzed by a plurality of background models having different time spans. In the method, a long-term background model which is analyzed using a long time range and a short-term background model which is analyzed using a short time range are generated. When the mobile object is not detected by a background difference based on the short-term background model and is detected by a background difference based on the long-term background model for a predetermined times, the mobile object is then detected as being a temporarily stationary object.

CITATION LIST

Patent Literature

[PTL 1] U.S. Pat. No. 5,058,010

[Non Patent Literature]

[NPL 1] KAWABATA ATSUSHI, TANIFUJI SHINYA, MOROOKA YASUO. "An Image Extraction Method for Moving Object", *Information Processing Society of Japan*, vol. 28, no. 4, pp. 395-402, 1987

[NPL 2] C. Stauffer and W. E. L. Grimson, "Adaptive background mixture models for real-time tracking", Proceedings of CVPR, vol. 2, pp. 246-252, 1999

SUMMARY OF INVENTION

Technical Problem

Here, as described in Non Patent Literature 1, a case in which a mobile object such as a person or a vehicle stays for a longer time than a time span for analyzing a background image in a method of obtaining a difference between an image to be analyzed and a background image by successively updating the background image will be considered. In this case, there is a problem that the mobile object cannot be detected since it is determined as a portion of a background image. On the other hand, when a time span for analyzing is increased for detecting a temporarily stationary object, the analysis is likely to be influenced by a change of a background due to an external noise such as illumination fluctuation, and therefore, there arises a problem that a temporary change of a background image other than the stationary object is often erroneously detected.

Patent Literature 1 aims at detecting a temporarily stationary object on the assumption that a background difference based on the long-term background model can express a true background at the time of obtaining an observed image. For this reason, it has been difficult to sufficiently suppress error detections in an environment in which a background gradually changes such as illumination fluctuation since there is a large difference from a true background at the time of obtaining an observed image in the long-term background model.

Some aspects of the present invention have been made in view of the above-described problems, and an object of the present invention is provide an image processing system, an image processing method, and a program storage medium for preferably detecting the mobile object.

Solution to Problem

An image processing system according to the invention including:
input means for receiving an input for some image frames having different times in a plurality of image frames constituting a picture, which is of a pixel on which a mobile object appears or a pixel on which a mobile object does not appear, for selected arbitrary one or more pixels in an image frame at the time of processing; and learning means for learning a parameter for detecting a mobile object based on the input.

An image processing system according to the invention including:

input means for receiving an input of a plurality of image frames having different capturing times; and detection means for using a first background model generated based on an image frame at the time of processing, a second background model in which an influence of an image frame at the time of processing is smaller than that of the first background model, and a third background model in which an influence of an image frame at the time of processing is smaller than that of the second background model, and performing one or more convolution calculations by using values of a background model of a neighboring region of a target pixel to detect a mobile object.

An image processing method according to the invention by a computer, includes:

receiving an input for some image frames having different times in a plurality of image frames constituting a picture, which is of a pixel on which a mobile object appears or a pixel on which a mobile object does not appear, for selected arbitrary one or more pixels in an image frame at the time of processing, and learning a parameter for detecting a mobile object based on the input.

An image processing method according to the invention by a computer, includes:

receiving an input of a plurality of image frames having different capturing times, and using a first background model generated based on an image frame at the time of processing, a second background model in which an influence of an image frame at the time of processing is smaller than that of the first background model, and a third background model in which an influence of an image frame at the time of processing is smaller than that of the second background model, and performs one or more convolution calculations by using values of a background model of a neighboring region of a target pixel to detect a mobile object.

A program storage medium according to the invention for storing a program causing a computer to execute a processing of receiving an input for some image frames having different times in a plurality of image frames constituting a picture, which is of a pixel on which a mobile object appears or a pixel on which a mobile object does not appear, for selected arbitrary one or more pixels in an image frame at the time of processing; and a processing of learning a parameter for detecting a mobile object based on the input.

A program storage medium for storing a program causing a computer to execute a processing of receiving an input of a plurality of image frames having different capturing times, and a processing of using a first background model generated based on an image frame at the time of processing, a second background model in which an influence of an image frame at the time of processing is smaller than that of the first background model, and a third background model in which an influence of an image frame at the time of processing is smaller than that of the second background model, and performing one or more convolution calculations by using values of a background model of a neighboring region of a target pixel to detect a mobile object.

In the present invention, a "unit", "means", "apparatus", or a "system" does not simply means a physical means, and also includes a software realizing a function of the "unit", "means", "apparatus", or "system". A function of one "unit", "means", "apparatus", or "system" may be realized by two or more physical means or apparatuses, or two or more functions of a "unit", "means", "apparatus", or a "system" may be realized by one physical means or apparatus.

Advantageous Effects of Invention

According to the present invention, an image processing system, an image processing method, and a program storage medium for preferably detecting a mobile object can be provided.

BRIEF DESCRIPTION OF DRAWINGS

FIG. 9 is a functional block diagram schematically illustrating an image processing system according to a second example embodiment.

FIG. 10 is a functional block diagram schematically illustrating an image processing system according to a second example embodiment.

DESCRIPTION OF EMBODIMENTS

In the following, example embodiments according to the present invention will be described. In the description of the following explanation and drawings to be referred to, identical or similar configurations have identical or similar signs, respectively.

1 First Example Embodiment 1.1 Summary

FIGS. 1 to 7 are diagrams illustrating example embodiments. Hereinafter, description will be made with reference to these drawings.

The present example embodiment relates to an image processing system for detecting a mobile object which repeats moving or temporarily loitering such as a person or a vehicle from a picture captured by an imaging apparatus such as a camera. In particular, an image processing system according to the present example embodiment preferably detects the mobile object such as a person or a vehicle even in cases in which an environment gradually changes such as a case of illumination fluctuation.

For this reason, an image processing system according to the present example embodiment generates three background models which are each created based on an image frame at each time taken out from a picture, and detects a mobile object using these background models. These three background models each have a different time span (time span to be analyzed) during which a plurality of image frames on which each background model is based are captured. Hereinafter, these three background models are referred to as a long-term background model, an intermediate-term background model, and a short-term background model.

Here, an image processing system according to the present example embodiment determines a region (mobile object region) in which the mobile object appears and a background region in which the mobile object is absent by applying a nonlinear function to the short-term background model, the intermediate-term background model, and the long-term background model. More specifically, the image processing system according to the present example embodiment determines a mobile object region using a CNN (also referred to as "Convolution Neural Network") as a nonlinear function. This method is roughly divided into two phases: (1) a phase in which the mobile object detection model (parameter) for determining the mobile object is learned (supervised learning) and (2) a phase in which the mobile object is detected by using a generated mobile object detection model.

Figure 2:
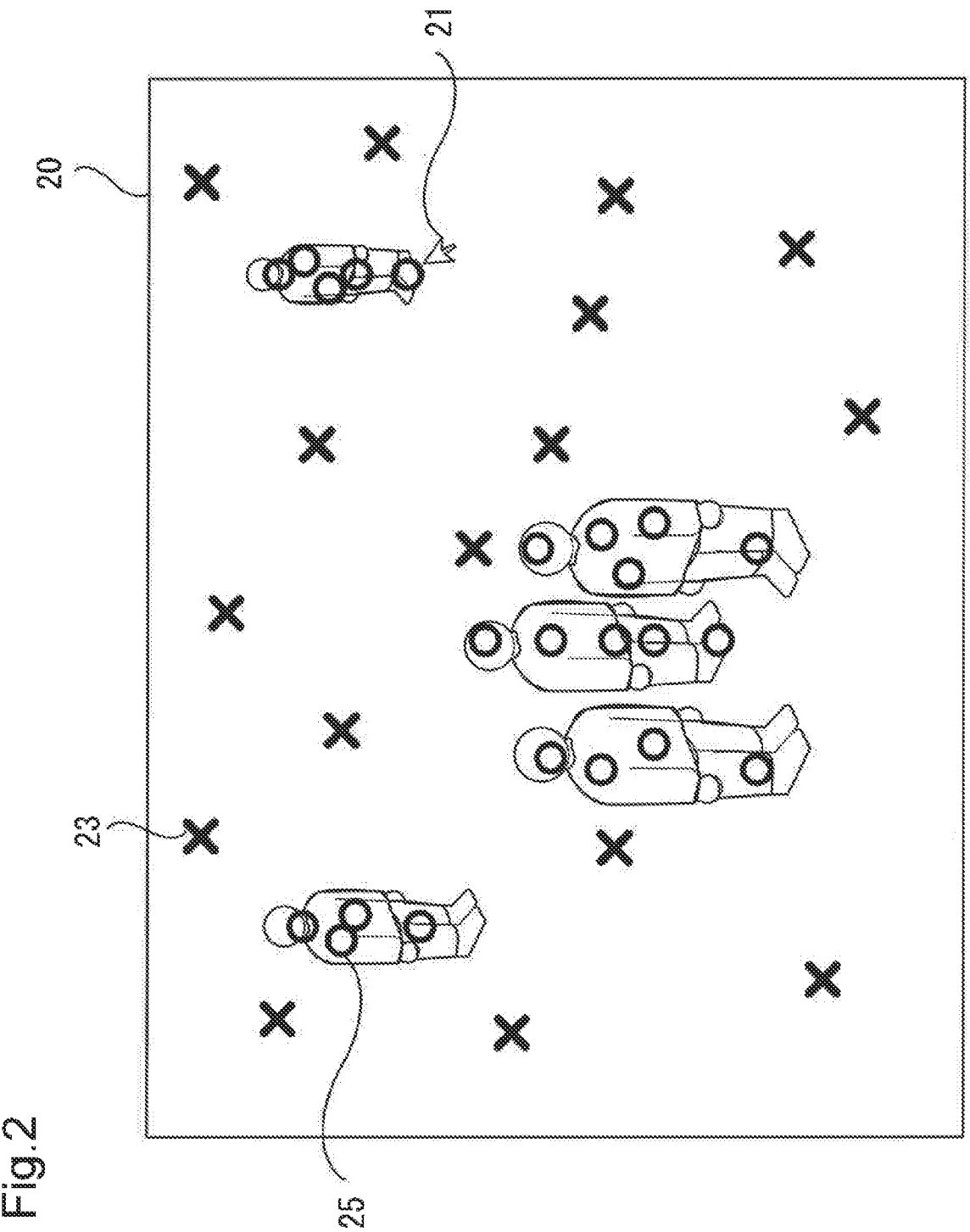
FIG. 2 is a diagram illustrating a specific example of a display screen.

First, a method of generating correct answer data for generating a mobile object detection model will be described. An image processing system receives designation of a pixel of a mobile object region and a pixel of a background region for an input image frame of each capturing time as a correct answer data from a user. FIG. 2 is a screen example of a GUI (Graphical User Interface) display which receives designation of a pixel of the mobile object region and a pixel of a background region.

In an example of FIG. 2, a cursor 21 is displayed on an image frame A user operates a cursor 21 by a pointing device such as a mouse, and places an icon 23 on a background region and places an icon 25 on the mobile object region in which a person appears. A user does not need to designate all pixels of the image frame 20 to be the mobile object region or the background region. The image processing system generates a mobile object detection model of CNN by using pixels which have thus been designated as the mobile object region or the background region.

Figure 3:
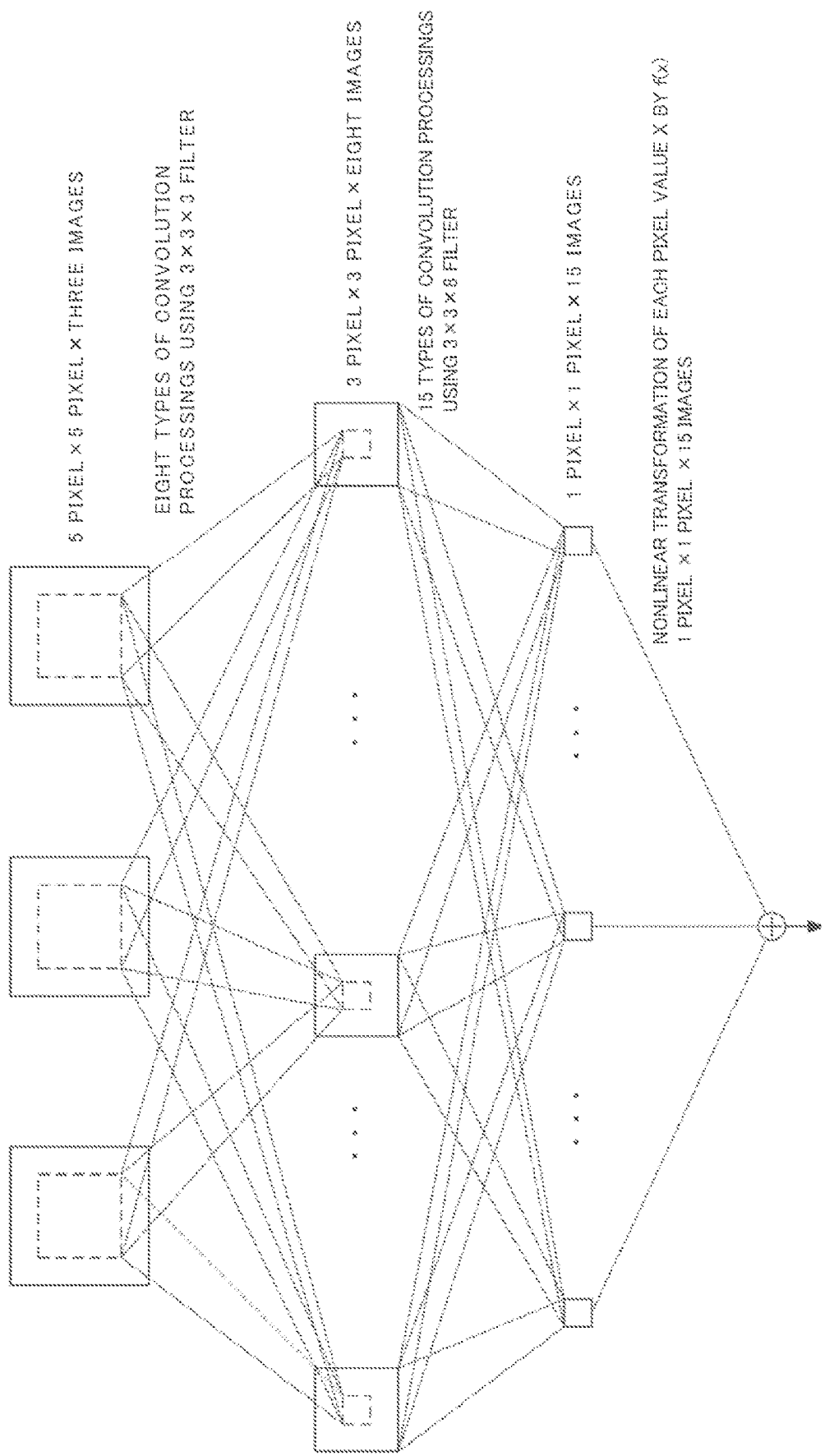
FIG. 3 is a diagram illustrating a method of detecting a mobile object according to the present example embodiment.

FIG. 3 illustrates a specific example of CNN which can use an image processing system according to the present example embodiment. In the example illustrated in FIG. 3, first, with respect to a pixel position where whether a mobile object appears on the pixel or not is desired to be determined, a 5 pixel×5 pixel image centered on the pixel position is extracted from each of a difference image between the short-term background model and the intermediate-term background model, a difference image between the short-term background model and the long-term background model, and a difference image between the intermediate-term background model and the long-term background model.

Based on the above, eight 3 pixel×3 pixel images are generated by performing eight types of convolution processings using eight types of 3×3×3 filters. Further, a nonlinear transformation is performed by applying the following formula f(x) to a pixel value x in each image.

$$f(x) = \frac{1}{\exp(x-a) + 1} \quad \text{[Math. 1]}$$

Here, a is a parameter which is defined for each pixel of images obtained by eight types of filters, which is determined by supervised learning. The generated eight 3 pixel×3 pixel images correspond to nodes of a neural network.

Similarly, with respect to these eight 3 pixel×3 pixel images, 15 types of convolution processings are performed by using 15 types of 3×3×8 filters to generate 15 1 pixel×1 pixel images. Based on the above, the above-described f(x) is applied to a pixel value x in each of the images. Similarly to the above, a parameter a contained in f(x) is a parameter defined for each pixel of images obtained by the 15 types of filters, which is determined by the above-described supervised learning. The generated 15 1 pixel×1 pixel images correspond to nodes of a neural network.

Lastly, with respect to these 15 1 pixel×1 pixel images, a convolution processing is performed by using 1 type of 1×1×15 filter to calculate one value. Based on that, the above-described f(x) is applied to the one value. Similarly to the above, the parameter a contained in the f(x) is a parameter defined with respect to a value obtained by the one filter, which is determined by the above-described supervised learning.

A value obtained by such a processing is herein referred to as "mobile object-ness" v. Whether a pixel position is a mobile object or not is determined by comparison with a threshold T preset with respect to v. When v≥T, a pixel position to be processed is determined to be the mobile object, and when v<T, the pixel position is determined to be a background region. The value of the threshold T is a preset parameter.

As described above, a parameter which is used for CNN such as a parameter a or T is estimated by supervised learning, and is stored in a mobile object detection parameter dictionary described below. By performing learning of a parameter, construction of a mobile object detection model in which a specific mobile object is easily detected, such as utilizing a background model having a time span in which a motion of a specific mobile object such as a person or a vehicle is correctly detected without frequently utilizing a background model having a time span in which a motion such as swaying of a tree by a wind is likely to be detected, is possible.

Accordingly, an image processing system according to the present example embodiment can stably detect, as a moving object, a mobile object such as a person or a vehicle even under an environment which is influenced by a background change due to an external noise such as illumination fluctuation or a wind.

In an example of a mobile object detection model in FIG. 3, eight intermediate images and 15 intermediate images are generated from difference images of three background models to calculate a final mobile object-ness v, but the mobile object detection model of the present invention is not limited thereto. For example, the number of difference images of a background model to be input may be four or more, and the numbers of intermediate images may be more than the above or less than the above.

1.2 System Configuration

Figure 4:
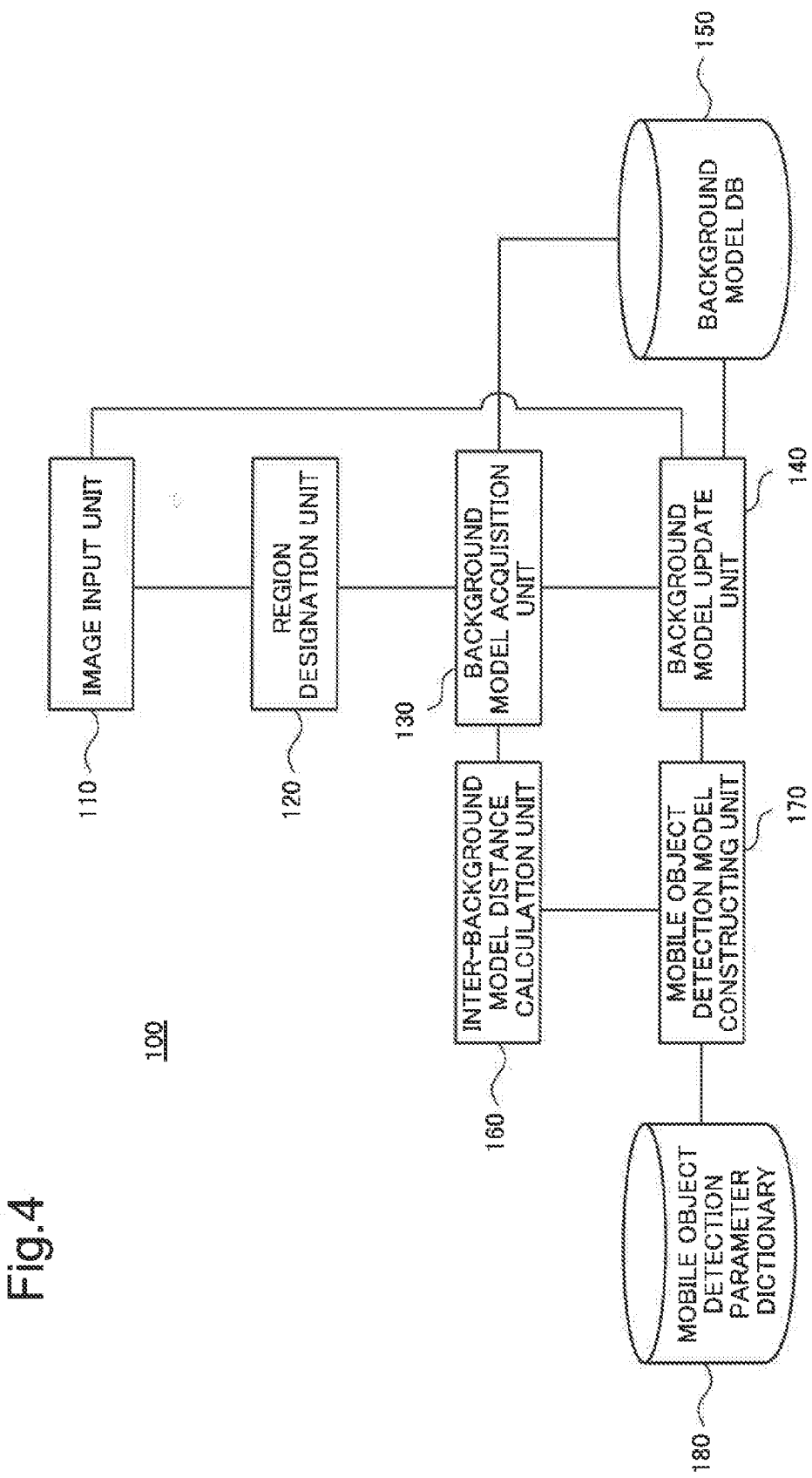
FIG. 4 is a functional block diagram schematically illustrating an image processing system according to a first example embodiment.
Figure 5:
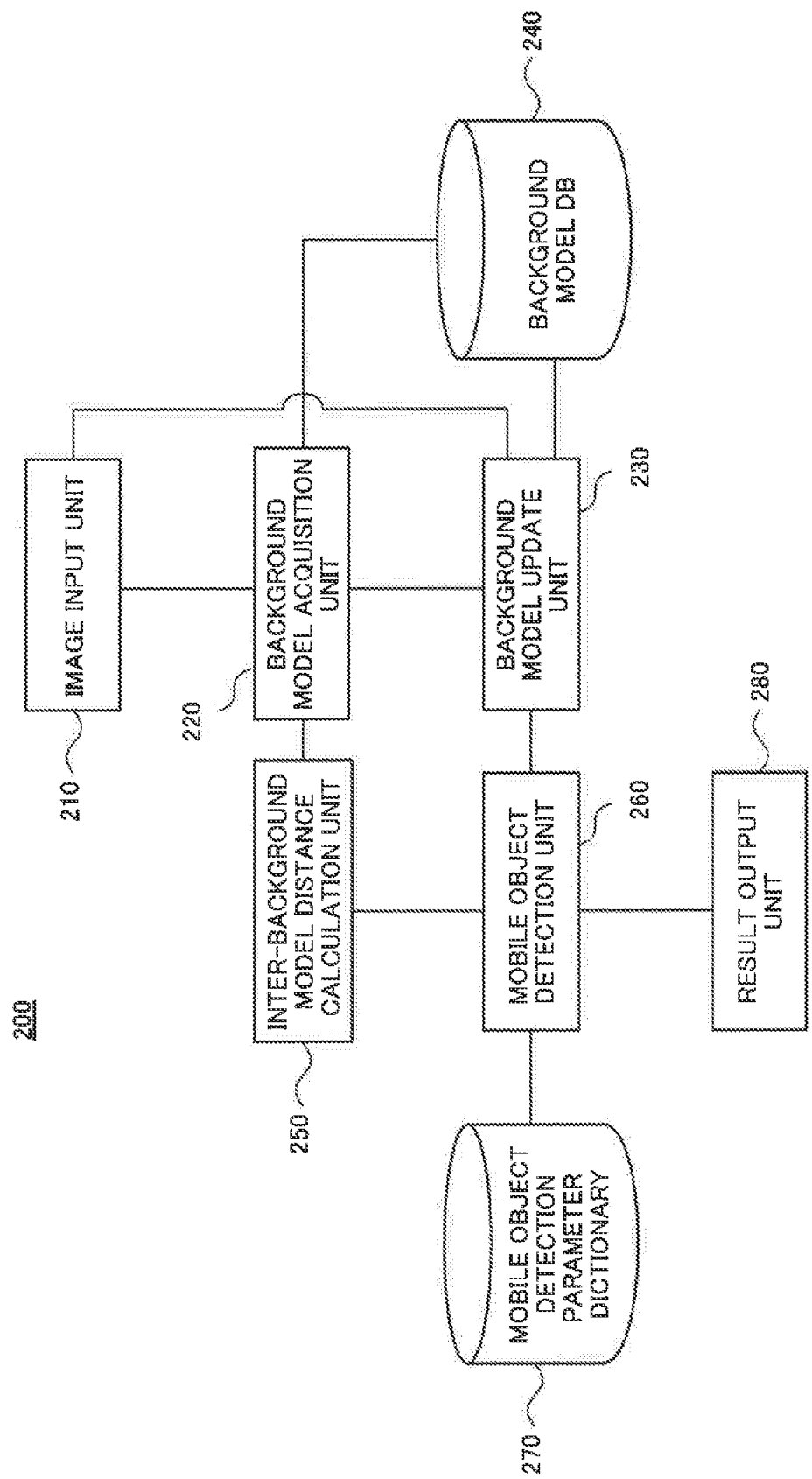
FIG. 5 is a functional block diagram schematically illustrating an image processing system according to the first example embodiment.

Hereinafter, by using FIG. 4 and FIG. 5, a system configuration of an image processing system according to the present example embodiment will be described. FIG. 4 illustrates a system configuration of an image processing system 100 which performs learning relating to generation of a mobile object detection model (parameter) for detecting a mobile object. FIG. 5 illustrates a system configuration of an image processing system 200 detecting the mobile object by using a generated mobile object detection model. The image processing systems 100 and 200 of FIGS. 4 and 5 may be realized on an identical apparatus or may be realized on different apparatuses.

1.2.1 System Configuration of Image Processing System 100 Used for Learning First, with reference to FIG. 4, the system configuration of the image processing system 100 for generating a mobile object detection model of CNN for detecting a mobile object will be described. The image processing system 100 includes an image input unit 110, a region designation unit 120, a background model acquisition unit 130, a background model update unit 140, a background model database (DB) 150, an inter-background model distance calculation unit 160, a mobile object detection model constructing unit 170, and a mobile object detection parameter dictionary 180.

1.2.1.1 Image Input Unit 110

The image input unit 110 receives an input of image frames constituting a picture, i.e., image frames each having a different capturing time from an unillustrated capturing apparatus such as a camera. Here, the image frame may be a monochrome image or may be a color image. When an image frame is a monochrome image, one value is contained in each pixel of the image frame. When an image frame is a color image, three values (color expression such as RGB or YCbCr) are contained in each pixel of the image frame. Alternatively, four or more values such as distance information obtained by a TOF (Time of Flight) camera or the like may be contained in the image frame.

1.2.1.2 Region Designation Unit 120

The region designation unit 120 provides a GUI for inputting a correct answer data to an image frame to a user, and distinguishes between a mobile object region and a background region for a pixel contained in the image frame depending on an input from the user. A specific example of a display screen on which the region designation unit 120 displays on a display apparatus is as illustrated in FIG. 2.

By this, the region designation unit 120 can prepare a correct answer data (a distinction between a mobile object region and a background region) for a pixel selected by a user in the image frame.

As known from that a distinction between the mobile object region and a background region is made with respect to a pixel, a point is input for a variety of positions on the screen. Since a point is input for each of a variety of positions, even a small number of inputs generate a variety of learning data, resulting in favorable learning efficiency. A distinction between the mobile object region and the background region is made for images of different times. By this, a variety of learning data (correct answer data) is generated, resulting in favorable learning efficiency.

1.2.1.3 Background Model Acquisition Unit 130

The background model acquisition unit 130 reads an image frame input from the image input unit 110, and three background models, the short-term background model, the intermediate-term background model, and the long-term background model stored in a background model DB 150.

1.2.1.4 Background Model DB 150

The background model DB 150 stores a plurality of background models including the short-term background model, the intermediate-term background model, and the long-term background model each of whose analysis source image frames have different time spans of capturing times. Here, a variety of types of each background model may be employed, and for example, an image format similar to that of an image frame input from the image input unit 110 can be employed. For example, in the case of a background model of a monochrome image, each pixel includes one value, and in the case of a background model of a color image, each pixel includes three values.

Alternatively, a background model may also be a distribution function for pixels expressing, for each pixel, the likelihood of the pixel value of each of the source image frame thereof. Here, the distribution function may be a histogram, or a distribution function obtained by the sum of a plurality of Gaussian distributions.

As described above, the short-term background model, the intermediate-term background model, and the long-term background model have different time spans of capturing times of source image frames, respectively, and the time span becomes longer in the order of the short-term background model, the intermediate-term background model, and the long-term background model. In particular, regarding the short-term background model, an image frame input from the image input unit 110 may be employed as the short-term background model as it is. In this case, the short-term background model may be not controlled by the background model DB 150.

1.2.1.5 Background Model Update Unit 140

The background model update unit 140 generates the short-term background model, the intermediate-term background model, and the long-term background model taking into account an image frame at the time of processing (an image frame of the newest time) from an image frame at the time of processing acquired by the background model acquisition unit 130 and a background model store in the background model DB 150. The generated background model is stored in the background model DB 150.

Figure 1:
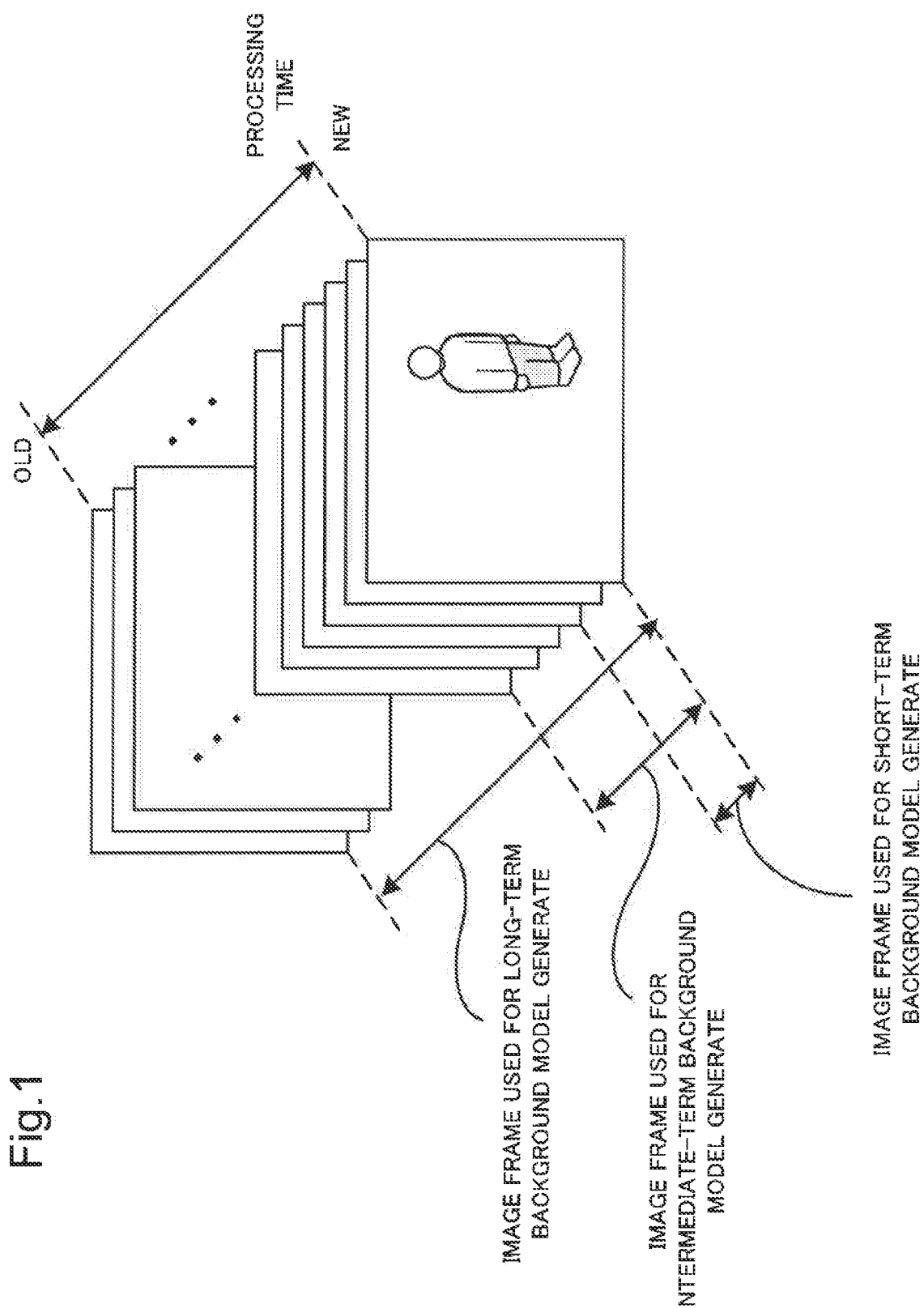
FIG. 1 is a diagram illustrating a relationship between a background model and an input image frame.

In the present example embodiment, the short-term background model, the intermediate-term background model, and the long-term background model have different time spans of capturing times of source image frames, respectively. As illustrated in FIG. 1, the short-term background model is generated by image frames captured from the time of processing for a shortest time span, the intermediate-term background model is generated by image frames captured from the time of processing for a time span longer than the shortest time span, and the long-term background model is generated by image frames captured from the time of processing for a longest time span.

As a method of generating a background model, for example, an average value or a mode of a pixel value may be determined for image frames for a time span defined for each background model. Alternatively, when a background model is a distribution function for each pixel as described above, a distribution function of pixel value of each image frame contained in a time span may be generated.

In the present example embodiment, the short-term background model, the intermediate-term background model, and the long-term background model are described as those having different time spans of capturing times of source image frames, respectively, but are not limited thereto. The short-term background model, the intermediate-term background model, and the long-term background model each can be understood as a background model having different magnitude of an influence which an image frame at the time of processing (at the newest time) has. That is, in the short-term background model, an image frame at the time of processing has the largest influence, and in the long-term background model, an image frame at the time of processing has the smallest influence. Therefore, by introducing a concept of an updating coefficient instead of using a concept of a time span, the short-term background model, the intermediate-term background model, and the long-term background model may be a different updating coefficient when a background model is updated using an image frame input from the image input unit 110.

In this case, for example, when a background model is $I_{bg}$, and an image frame input from the image input unit 110 is I, by the following formula:

$$I_{bg} \leftarrow (1-a) \times I_{bg} + a \times I,$$ [Math. 2]

the background model can be updated. In this formula, a is a constant of from 0 to 1, and a short-term background model, an intermediate-term background model, and a long-term background model have different values. When the constant of the short-term background model, the intermediate-term background model, and the long-term background model are $a_1$, $a_2$, and $a_3$, the relationship:

$$0 \leq a_3 < a_2 < a_1 \leq 1$$ [Math. 3]

is satisfied. When $a_1 = 1$, the short-term background model is always replaced with a new image frame. When $a_3 = 0$, the long-term background model means that a fixed background model is used. Even when a fixed background model is used for a background model, updating is possible by a similar manner.

1.2.1.6 Inter-Background Model Distance Calculation Unit 160

The inter-background model distance calculation unit 160 calculates distance values which are differences between three inter-background models acquired by the background model acquisition unit 130 represented by numeral values for each pixel. Specifically, the inter-background model distance calculation unit 160 calculates, for each pixel, a distance between the short-term background model and the intermediate-term background model, a distance between the short-term background model and the long-term background model, and a distance between the intermediate-term background model and the long-term background model.

For example, when a background model is in an image format, the inter-background model distance calculation unit 160 may calculate a difference value or a difference vector of the pixel value of each pixel, and then calculate the absolute value of the size as the size thereof. When a background model has a plurality of values for each pixel, for example, when the background model is in a color image format such as RGB, YCbCr, or HSV, the calculation unit may calculate the difference value for each value, and then define the sum of the absolute values of the difference values as a distance of each pixel. Alternatively, the calculation unit may extract a neighboring partial image such as a neighboring 3 pixel×3 pixel image or a 5 pixel×5 pixel image centered on a pixel position to be processed, and then, regarding pixel values of the extracted two neighboring partial images as two vectors, respectively, may calculate a distance or a normalized correlation r between two vectors. In this case, for example, when a distance is calculated by neighboring 3×3 images using a background model in a monochrome image format, a distance between 9-order vectors is to be calculated. When a distance is calculated by neighboring 5×5 images using a background model in a RGB color image format, a distance between 75-order (5×5×3) vectors is to be calculated.

When a normalized correlation r is used as a distance, the maximum value of the correlation r is 1, and the closer the r is to 1, the closer two vectors are to identical. Therefore, in order to convert to a distance scale, 1-r can be used as a distance value. Alternatively, a distance may be calculated after the pre-processing of the above-described neighboring partial image by an edge enhancement filter or the like.

When a distribution function such as a histogram is used for a background model, the inter-background model distance calculation unit 160 can calculate a distance of an inter-background model by using a histogram distance calculation method such as the area of common part of two histograms or the Bhattacharyya distance.

In the above-described method, the inter-background model distance calculation unit 160 is described as one which calculates a distance for each pixel, but is not limited thereto. For example, a method such as calculating, after dividing an image into some meshes each of which is a region unit, a distance for each of the mesh unit may be used. A distance may have a negative value.

Each of the short-term background model, the intermediate-term background model, and the long-term background model may be a different format. For example, the short-term background model may be an image format, and the intermediate-term background model may be a distribution function for each pixel. In this case, as a method of calculating a distance, for example, a histogram of a normal distribution with a preset standard deviation centered on a pixel value stored in the short-term background model is generated. A method of calculating, by regarding the histogram as a distribution function in the short-term background model, a distance by comparing the histogram with a histogram of the intermediate-term background model may be employed. Alternatively, a distance may be calculated by comparing the intermediate-term background model in an image format which is formed as a set of average values each of which is calculated from a distribution function of each pixel of the intermediate-term background model for each pixel with the short-term background model.

1.2.1.7 Mobile Object Detection Model Constructing Unit 170

The mobile object detection model constructing unit 170 generates a mobile object detection model (parameter corresponding to CNN) for detecting a mobile object by using CNN, by using a correct answer data given by the region designation unit 120. More specifically, the mobile object detection model constructing unit 170 is set so as to be the closest to the given correct answer data. Specifically, assuming that a correct answer data $y_i$ is given to each of N pixels $x_i$ (i is an integer satisfying $1 \leq i \leq N$). Here, for example, when a pixel $x_i$ is a background region, $y_i$0, and when the pixel is a mobile object region, $y_i=1$.

For each parameter of CNN, a random value may be set as an initial value. After that, a mobile object-ness is calculated by using CNN with respect to the above-described N pixels. Here, an estimation result (mobile object-ness) representing either a mobile object region or a background region with respect to the pixel $x_i$ is defined as $v_i$. In this case, the following evaluation value S is considered.

$$S = \sum_i^N (vi - yi)^2 \qquad \text{[Math. 4]}$$

The closer the estimation result by CNN is to a correct answer data, the smaller the evaluation value S is. Therefore, in order to make S as small as possible, a parameter of CNN may be determined by a gradient method such as a probabilistic descent method.

Another calculation method of an evaluation value S may be used. For example, a value equivalent to a cross entropy, $$S = \sum_i^N \{-yi \times \log_e vi - (1 - yi) \times \log_e (1 - vi)\} \qquad \text{[Math. 5]}$$

may be used.

A method of generating a correct answer data by the above-described region designation unit 120 is performed by a user with respect to a random position. In such a method, in some cases, learning data is not sufficient, and estimation accuracy at a specific location may be deteriorated. Accordingly, the following procedure: generating a mobile object detection model by performing learning by a correct answer data given by the region designation unit 120; giving an additional correct answer data with respect to low estimation accuracy with reference to an estimation result; and performing learning again by using the correct answer data, may be repeated.

By such a processing, a mobile object detect parameter generated by the mobile object detection model constructing unit 170 is stored in the mobile object detection parameter dictionary 180.

1.2.2 System Configuration of Image Processing System 200 Used for Detecting Mobile Object Next, a system configuration of an image processing system 200 for detecting a mobile object by using a mobile object detection model generated by the above-described image processing system 100 will be described. The image processing system 200 includes an image input unit 210, a background model acquisition unit 220, a background model update unit 230, a background model DB 240, an inter-background model distance calculation unit 250, a mobile object detection unit 260, a mobile object detection parameter dictionary 270, and a result output unit 280.

Here, since functions of the image input unit 210, the background model acquisition unit 220, the background model update unit 230, the background model DB 240, the inter-background model distance calculation unit 250, and the mobile object detection parameter dictionary 270 are similar to those of the image input unit 110, the background model acquisition unit 130, the background model update unit 140, the background model DB 150, the inter-background model distance calculation unit 160, and the mobile object detection parameter dictionary 180, the description thereof will be omitted.

The mobile object detection unit 260 determines whether a mobile object is detected or not by a CNN which is a mobile object detection model by using a parameter stored in the mobile object detection parameter dictionary 270. Since a specific method of detecting the mobile object has been described above with reference to FIG. 3, a description thereof will be omitted here. The mobile object detection unit 260 may detect a resting mobile object by the mobile object detection model using a parameter stored in the mobile object detection parameter dictionary 270, and may detect a moving mobile object based on a difference between the intermediate-term background model and the short-term background model.

The result output unit 280 outputs information of the mobile object obtained by the mobile object detection unit 260. A variety of methods of outputting such information are acceptable, and for example, such information can be output by a binary image in which a mobile object region is 1 and the other than region is 0. Alternatively, a joining segment may be generated by performing a labeling processing on the binary image, and a circumscribed rectangle may be output for each joining segment.

Alternatively, a case in which a moving mobile object and a temporarily resting mobile object can be detected by the mobile object detection unit 260 will be taken into account. In this case, for example, a three-valued output in which the pixel value of a pixel detected as a moving mobile object is set to 1, the pixel value of a pixel detected as a temporarily resting mobile object is set to 2, and the pixel value of a pixel other than the above is set to 0 may be used. As the case may be, either a moving object or a resting object may be hard to be determined. In such cases, the pixel value of the moving object may be output as 1. Alternatively, after making a four-valued output available, the pixel value of a pixel which cannot be determined which may be output as 3.

1.3 Processing Flow

Figure 6:
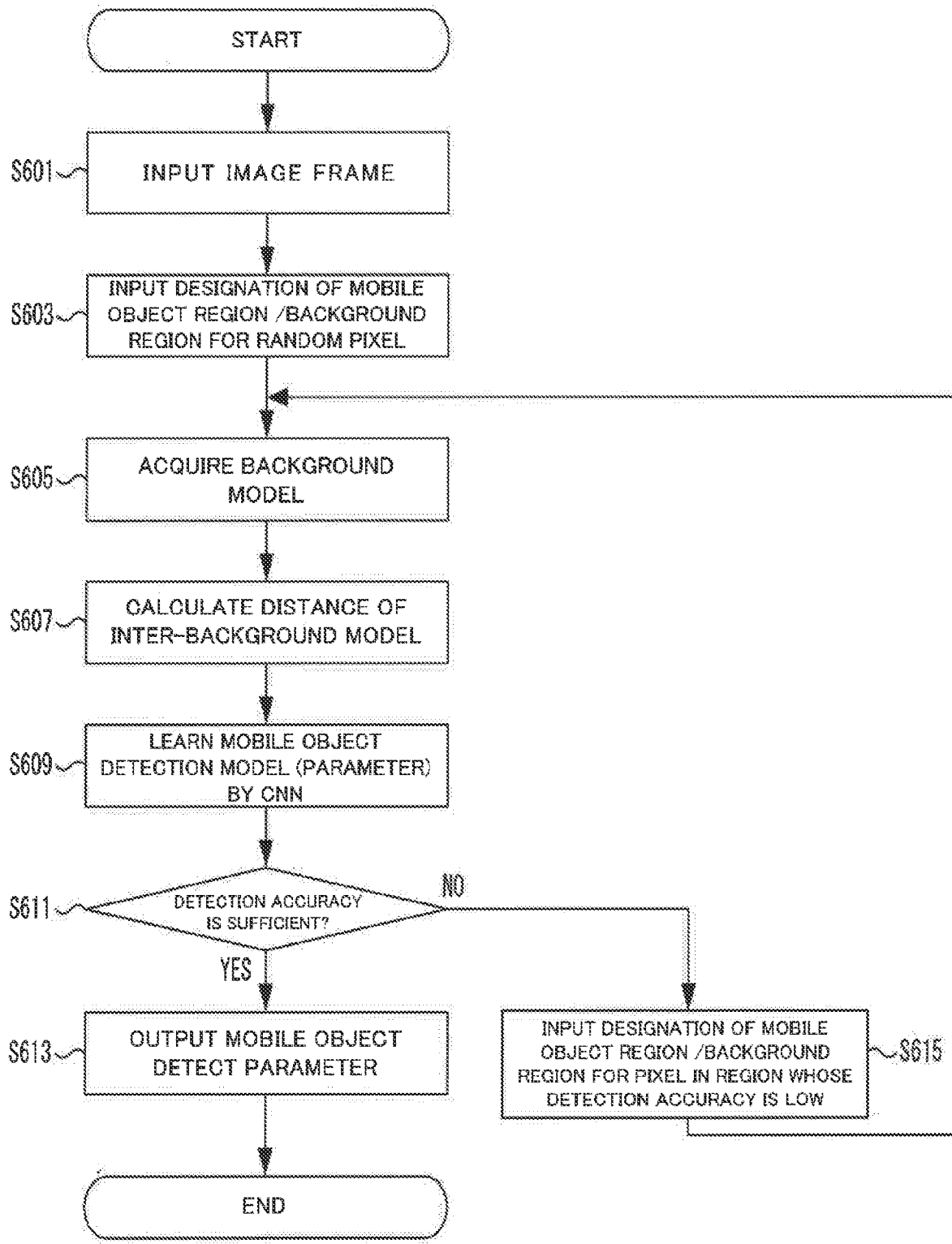
FIG. 6 is a flow chart illustrating a processing flow of an image processing system illustrated in FIG. 4.
Figure 7:
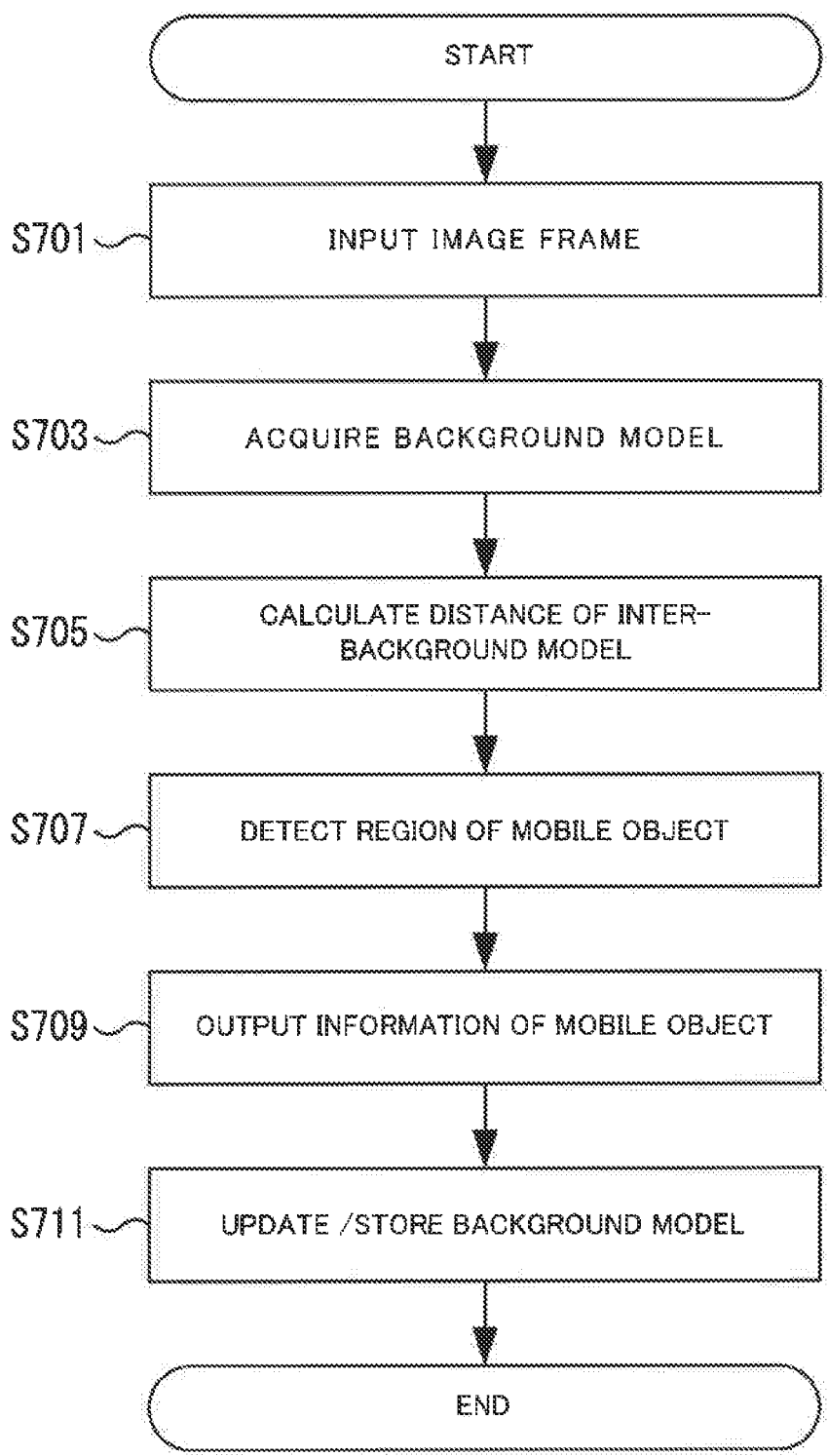
FIG. 7 is a flow chart illustrating a processing flow of an image processing system illustrated in FIG. 5.

Hereinafter, a processing flow of the image processing system 100 and the image processing system 200 will be described with reference to FIGS. 6 and 7. FIG. 6 is a flow chart illustrating a processing flow of the image processing system 100, and FIG. 7 is a flow chart illustrating a processing flow of the image processing system 200.

Each processing step in the following may be executed in an arbitrary sequence or in parallel within the scope of not creating any inconsistencies in the processing contents, and another step may be added between the processing steps. Further, a step described as one step for the sake of convenience may be executed in a plurality of substeps, and steps described as substeps for the sake of convenience may be executed as one step.

1.3.1 Processing Flow of Image Processing System 100

First, a processing flow of the image processing system 100 which learns a parameter for detecting a mobile object will be described with reference to FIG. 6.

The image input unit 110 receives an input of a new image frame (an image frame at the time of processing) (S601). In order to receive an input of a correct answer data for an input image frame, the region designation unit 120 displays a display screen which is a specific example illustrated in FIG. 2, and receives a designation of a mobile object region or a background region from a user with respect to one or more pixels at random positions in the image frame (S603). Based on the designation, the region designation unit 120 generates a correct answer data representing whether a pixel is the mobile object region or not. Here, an input is received by the image input unit 110 with respect to a predetermined number of a plurality of image frames of different times. Here, the predetermined number is arbitrary and may be preset, or may be designated by a user.

The background model acquisition unit 130 reads the short-term background model, the intermediate-term background model, and the long-term background model stored in the background model DB 150 (S605). The inter-background model distance calculation unit 160 calculates, for each pixel, a distance between the short-term background model and the intermediate-term background model, a distance between the intermediate-term background model and the long-term background model, and a distance between the short-term background model and the long-term background model (S607).

The mobile object detection model constructing unit 170 applies CNN to a pixel for which a correct answer data is prepared in each background model calculated by the inter-background model distance calculation unit 160, and determines a parameter of CNN such that the evaluation value S is small (S609). That is, a mobile object detection model is constructed by learning.

The image processing system 100 displays a detection result of the mobile object of a sample data by the learnt mobile object detection model. When a detection result is displayed, the image processing system 100 may display the above-described estimated result (mobile object-ness) $v_i$ as a reliability for the detection result of the mobile object near a detected mobile object region. Alternatively, the above-described estimated result may be displayed similarly to a heat map in accordance with the value of $v_i$. Specifically, for example, the image processing system 100 may display the result in such a manner that the higher the value of $v_i$, the redder, and the lower the value of $v_i$, the bluer. As described above, a detection result of the mobile object by a learnt mobile object detection model is determined by a visual inspection by a person. When the detection accuracy of the mobile object by the mobile object detection model is sufficient (Yes in S611), the mobile object detection model constructing unit 170 outputs a calculated parameter to a mobile object detection parameter dictionary 180 (S613).

When the detection accuracy of the mobile object by the mobile object detection model is insufficient (No in S611), the region designation unit 120 receives an input whether a random pixel in a region whose detection accuracy is particularly low is a mobile object region or not by a display screen as illustrated in FIG. 2 from a user (S615). After that, a process returns to S605, and construction of a mobile object detection model using a new correct answer data is performed.

1.3.2 Processing Flow of Image Processing System 200

Next, a processing flow related to detection of a mobile object using a parameter of CNN generated by the image processing system 100 will be described with reference to FIG. 7.

The image input unit 210 receives an input of a new image frame (image frame at the time of processing) (S701). The background model acquisition unit 220 reads the short-term background model, the intermediate-term background model, and the long-term background model stored in the background model DB 240 (S703).

The inter-background model distance calculation unit 250 calculates, for each pixel, a distance between the short-term background model and the intermediate-term background model, a distance between the intermediate-term background model and the long-term background model, and a distance between the short-term background model and the long-term background model (S705). The mobile object detection unit 260 determines whether each pixel is a region on which a mobile object appears or not by using a parameter generated by the image processing system 100 stored in the mobile object detection parameter dictionary 270, and using a distance of each inter-background model calculated by the inter-background model distance calculation unit 250 as an input (S707). The result output unit 280 outputs a detection result (S709).

The background model update unit 230 updates each background model by using an image frame input from the image input unit 210, and stores the updated background model in the background model DB 240 (S711).

1.4 Specific Example of Hardware Configuration

Hereinafter, with reference to FIG. 8, one example of a hardware configuration when the above-described image processing systems 100 and 200 are realized by a computer 800 will be described. As described above, the image processing systems 100 and 200 may be contained in an identical computer, or functions of the image processing systems 100 and 200 may be contained in a plurality of computers.

Figure 8:
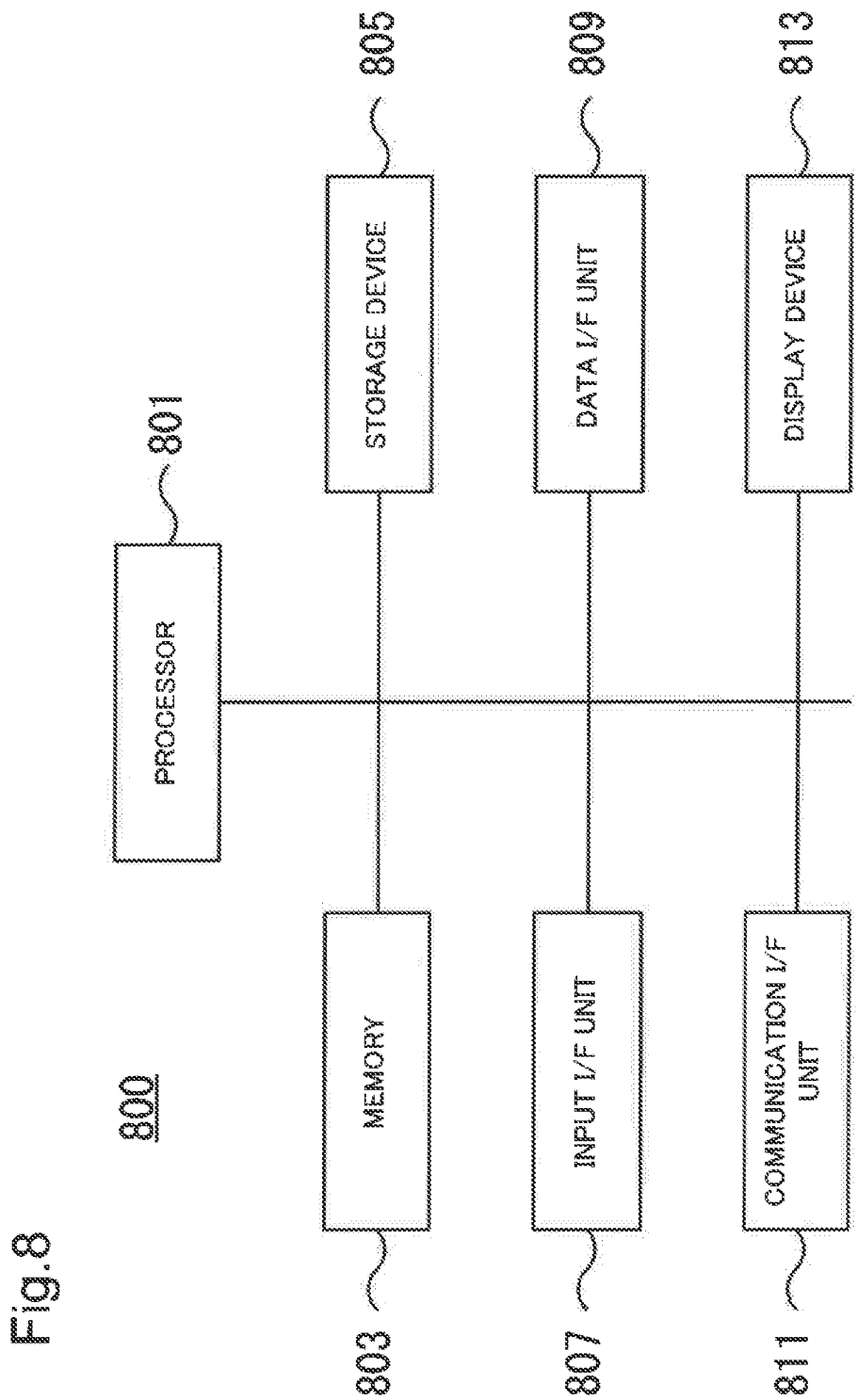
FIG. 8 is a block diagram illustrating a hardware configuration which can implement an image processing system shown in FIGS. 4 and 5.

As illustrated in FIG. 8, the computer 800 includes a processor 801, a memory 803, a storage apparatus 805, an input interface (I/F) unit 807, a data I/F unit 809, a communication I/F unit 811, and a display apparatus 813.

The processor 801 controls a variety of processings of the image processing systems 100 and 200 by executing a program stored in the memory 803. For example, processings related to the image input unit 110, the region designation unit 120, the background model acquisition unit 130, the background model update unit 140, the inter-background model distance calculation unit 160, and the mobile object detection model constructing unit 170 illustrated in FIG. 4 can be realized as a program which is temporarily stored in the memory 803 and operates mainly on the processor 801. Similarly, processings related to the image input unit 210, the background model acquisition unit 220, the background model update unit 230, the inter-background model distance calculation unit 250, the mobile object detection unit 260, and the result output unit 280 illustrated in FIG. 5 can also be realized as a program which is temporarily stored in the memory 803 and operates mainly on the processor 801.

The memory 803 is, for example, a storage medium such as RAM (Random Access Memory). The memory 803 temporarily stores a program code which is executed by the processor 801 or a data required when a program is executed.

The storage apparatus 805 is, for example, a non-volatile storage medium such as a hard disk or a flash memory. The storage apparatus 805 can store a variety of programs for realizing functions of an operating system, or the image processing systems 100 and 200, or a variety of data including the background models DB 150 and 240, and the mobile object detection parameter dictionary 180 and 270. A program or data stored in the storage apparatus 805 is referred to by the processor 801 when it is loaded to the memory 803 as required.

An input I/F unit 807 is a device for receiving an input from a user. For example, in a display screen as illustrated in FIG. 2 which the region designation unit 120 provides, an operation of a user for designating a background region or a mobile object region is input by the input I/F unit 807.

Specific examples of the input I/F unit 807 include a keyboard, a mouse, or a touch panel. The input I/F unit 807 may be connected to the computer 800 via, for example, an interface such as a USB (Universal Serial Bus).

The data I/F unit 809 is a device for inputting data from outside the computer 800. Specific examples of the data I/F unit 809 include a drive device for reading data stored in a variety of storage apparatuses. The data I/F unit 809 may be provided outside the computer 800. In this case, the data I/F unit 809 is connected to the computer 800 via, for example, an interface such as a USB.

The communication I/F unit 811 is a device for performing data communication with an apparatus outside the computer 800 such as a capturing apparatus (a video camera, a surveillance camera, or a digital camera) by wire or wirelessly. The communication I/F unit 811 may be provided outside the image processing system 100. In this case, the communication I/F unit 811 is connected to the computer 800 via, for example, an interface such as a USB.

The display apparatus 813 is a device for displaying, for example, a display screen for designating a background region/mobile object region illustrated in FIG. 2 or a detection result of a mobile object output from the result output unit 280. Specific examples of the display apparatus 813 include a liquid crystal display or an organic EL (Electro-Luminescence) display. The display apparatus 813 may be provided outside the computer 800. In this case, the display apparatus 813 is connected to the computer 800 via, for example, a display cable.

1.5 Effect of Present Example Embodiment

As described above, the image processing systems 100 and 200 according to the present example embodiment detects a mobile object by CNN using differences between the short-term background model, the intermediate-term background model, and a long-term inter-background model. In particular, by using learning, a specific mobile object can be controlled while suppressing an error detection, by making the degree of contribution of a background model having a time span in which the mobile object such as a person or a vehicle can be easily detected large without frequently utilizing a background model having a time span in which a motion such as swaying of a tree by a wind is likely to be detected. The mobile object can be stably detected even under an environment influenced by a background change due to an external noise such as illumination fluctuation.

2 Second Example Embodiment

Hereinafter, a second example embodiment will be described with reference to FIGS. 9 and 10. FIG. 9 is a block diagram illustrating a configuration of a function of an image processing system 900 according to the present example embodiment. The image processing system 900 includes an input unit 910 and a learning unit 920.

The input unit 910 receives an input for some image frames having different times in a plurality of image frames constituting a picture, which is of a pixel on which a mobile object appears or a pixel on which a mobile object does not appear, for selected arbitrary one or more pixels in an image frame at the time of processing.

The learning unit 920 learns a parameter for detecting the mobile object based on an input of a pixel on which the mobile object appears or a pixel on which the mobile object does not appear, input from the input unit 910.

An image processing system 1000 includes an input unit 1010 and a detection unit 1020.

The input unit 1010 receives an input of a plurality of image frames having different capturing times.

The detection unit 1020 uses a first background model generated based on an image frame at the time of processing, a second background model in which an influence of an image frame at the time of processing is smaller than that of the first background model, and a third background model in which an influence of an image frame at the time of processing is smaller than that of the second background model, and performs one or more convolution calculations by using values of a background model of a neighboring region of a target pixel to detect a mobile object.

By employing the above-described implementation, the image processing system 900 and the image processing system 1000 according to the present example embodiment can preferably detect the mobile object.

3 Supplementary Notes

The configurations of the example embodiments described above may be combined or some configuration may be replaced with. The configuration of the present invention is not limited only to the example embodiments described above, and a variety of changes can be made without departing from the scope of the present invention.

Some or all of the example embodiments described above may also be described as the following Supplementary notes, but the present invention is not limited to the following. A program according to the present invention may be a program which causes a computer to execute each operation described in each of the above-described example embodiments.

Supplementary Note 1

An image processing system comprising:
input means for receiving an input for some image frames having different times in a plurality of image frames constituting a picture, which is of a pixel on which a mobile object appears or a pixel on which a mobile object does not appear, for selected arbitrary one or more pixels in an image frame at the time of processing; and
learning means for learning a parameter for detecting a mobile object based on the input.

Supplementary Note 2

The image processing system according to Supplementary Note 1, further comprising
calculation means for calculating differences between a first background model generated based on an image frame at the time of processing, a second background model in which an influence of an image frame at the time of processing is smaller than that of the first background model, and a third background model in which an influence of an image frame at the time of processing is smaller than that of the second background model, wherein
the learning means learns a parameter for detecting a mobile object using the first background model, the second background model, and the third background model, based on the input.

Supplementary Note 3

The image processing system according to Supplementary Note 1 or 2, wherein
the learning means learns the parameter to be used for a detection model for detecting a mobile object by performing one or more convolution calculation by using a value of a background model of a neighboring region of the one or more pixels.

Supplementary Note 4

The image processing system according to Supplementary Notes 1 to 3, wherein
the learning means learns, as the parameters, the convolution calculation, and a threshold compared with a value obtained as a result of the convolution calculation.

Supplementary Note 5

An image processing system comprising:
input means for receiving an input of a plurality of image frames having different capturing times; and
detection means for using a first background model generated based on an image frame at the time of processing, a second background model in which an influence of an image frame at the time of processing is smaller than that of the first background model, and a third background model in which an influence of an image frame at the time of processing is smaller than that of the second background model, and performing one or more convolution calculations by using values of a background model of a neighboring region of a target pixel to detect a mobile object.

Supplementary Note 6

The image processing system according to Supplementary Note 5, wherein
the first background model, the second background model, and the third background model have a different time span of capturing times of image frames to be considered.

Supplementary Note 7

The image processing system according to Supplementary Note 5 or 6, wherein
the image frame at the time of processing is used as the first background model.

Supplementary Note 8

An image processing method by a computer, comprising:
receiving an input for some image frames having different times in a plurality of image frames constituting a picture, which is of a pixel on which a mobile object appears or a pixel on which a mobile object does not appear, for selected arbitrary one or more pixels in an image frame at the time of processing, and
learning a parameter for detecting a mobile object based on the input.

Supplementary Note 9

The image processing method according to Supplementary note 8, further including calculation means for calculating differences between a first background model generated based on an image frame at the time of processing, a second background model in which an influence of an image frame at the time of processing is smaller than that of the first background model, and a third background model in which an influence of an image frame at the time of processing is smaller than that of the second background model, wherein
the learning means learns a parameter for detecting a mobile object using the first background model, the second background model, and the third background model, based on the input.

Supplementary Note 10

The image processing method according to Supplementary Note 8 or 9, wherein the method learns the parameter to be used for a detection model for detecting a mobile object by performing one or more convolution calculation by using a value of a background model of a neighboring region of the one or more pixels.

Supplementary Note 11

The image processing method according to at least one of Supplementary Notes 8 to 10, wherein the method learns, as the parameters, the convolution calculation, and a threshold compared with a value obtained as a result of the convolution calculation.

Supplementary Note 12

An image processing method by a computer comprising:
receiving an input of a plurality of image frames having different capturing times, and
using a first background model generated based on an image frame at the time of processing, a second background model in which an influence of an image frame at the time of processing is smaller than that of the first background model, and a third background model in which an influence of an image frame at the time of processing is smaller than that of the second background model, and performs one or more convolution calculations by using values of a background model of a neighboring region of a target pixel to detect a mobile object.

Supplementary Note 13

The image processing method according to Supplementary Note 12, wherein
the first background model, the second background model, and the third background model have a different time span of capturing times of image frames to be considered.

Supplementary Note 14

The image processing method according to Supplementary Note 12 or 13, wherein
the image frame at the time of processing is used as the first background model.

Supplementary Note 15

A program causing a computer to execute
a processing of receiving an input for some image frames having different times in a plurality of image frames constituting a picture, which is of a pixel on which a mobile object appears or a pixel on which a mobile object does not appear, for selected arbitrary one or more pixels in an image frame at the time of processing; and
a processing of learning a parameter for detecting a mobile object based on the input.

Supplementary Note 16

The program according to Supplementary Note 15, further comprising
calculation means for calculating differences between a first background model generated based on an image frame at the time of processing, a second background model in which an influence of an image frame at the time of processing is smaller than that of the first background model, and a third background model in which an influence of an image frame at the time of processing is smaller than that of the second background model, wherein
the learning means learns a parameter for detecting a mobile object using the first background model, the second background model, and the third background model, based on the input.

Supplementary Note 17

The program according to Supplementary Note 15 or 16, wherein
the program learns the parameter to be used for a detection model for detecting a mobile object by performing one or more convolution calculation by using a value of a background model of a neighboring region of the one or more pixels.

Supplementary Note 18

The program according to Supplementary Notes 15 to 17, wherein
the program learns, as the parameters, the convolution calculation, and a threshold compared with a value obtained as a result of the convolution calculation.

Supplementary Note 19

A program causing a computer to execute
a processing of receiving an input of a plurality of image frames having different capturing times, and
a processing of using a first background model generated based on an image frame at the time of processing, a second background model in which an influence of an image frame at the time of processing is smaller than that of the first background model, and a third background model in which an influence of an image frame at the time of processing is smaller than that of the second background model, and performing one or more convolution calculations by using values of a background model of a neighboring region of a target pixel to detect a mobile object.

Supplementary Note 20

The program according to Supplementary Note 19, wherein
the first background model, the second background model, and the third background model have a different time span of capturing times of image frames to be considered.

Supplementary Note 21

The program according to Supplementary Note 19 or 20, wherein
the image frame at the time of processing is used as the first background model.

The present invention has been described by way of example embodiments as described above as exemplary examples. However, the present invention is not limited to the above-described example embodiments. In other words, a variety of aspects which can be understood by those skilled in the art can be applied to the present invention without departing from the scope of the present invention.

This application claims the priority based on Japanese Patent Application No. 2014-115205 filed on Jun. 30, 2014, the entire disclosure of which is incorporated herein by reference.

REFERENCE SIGNS LIST

20: Image frame
21: Cursor
23, 25: Icon
100: Image processing system
110: Image input unit
120: Region designation unit
130: Background model acquisition unit
140: Background model update unit
150: Background model database
160: Inter-background model distance calculation unit
170: Mobile object detection model constructing unit
180: Mobile object detection parameter dictionary
200: Image processing system
210: Image input unit
220: Background model acquisition unit
230: Background model update unit
240: Background model database
250: Inter-background model distance calculation unit
260: Mobile object detection unit
270: Mobile object detection parameter dictionary
280: Result output unit
800: Computer
801: Processor
803: Memory
805: Storage apparatus
807: Input interface unit
809: Data interface unit
811: Communication interface unit
813: Display apparatus
900: Image processing system
910: Input unit
920: Learning unit

1000: Image processing system
1010: Input unit
1020: Detection unit

The invention claimed is:

1. An image processing system comprising:
at least one memory storing instructions; and
at least one processor configured to process the instructions to control the image processing system to:
receive an input to place a plurality of first icons that correspond to a vehicle and to place a plurality of second icons that correspond to other than the vehicle on one or more pixels for each of a plurality of image frames comprising an image; and
generate learning data to train a detection model for detecting the vehicle based on the placement of the plurality of first icons and the plurality of second icons on the one or more pixels of the plurality of image frames,
wherein the at least one processor is configured to process the instructions to control the image processing system to:
receive an input to designate an object region or a background region with respect to one or more pixels at random positions in the plurality of image frames, wherein
the detection model is obtained by training three background models using the generated learning data, and these three background models are different from each other in the number of image frames to be processed,
a first background model has the largest number of image frames to be processed, a second background model has the second largest number of image frames to be processed, and a third background model has the smallest number of image frames to be processed,
the at least one processor is configured to process the instructions to control the image processing system to:
calculate a first distance between the first background model and the second background model, a second distance between the second background model and the third background model, and a third distance between the first background model and the third background model for each pixel or unit region of the plurality of image frames;
determine, based on the first distance, the second distance, and the third distance, whether or not the vehicle is shown in a region corresponding to each pixel of the plurality of image frames; and
based on user input specifying whether some pixels in the plurality of image frames are pixels that correspond the vehicle or a pixel that does not show the vehicle, learn parameters for detecting the vehicle in the plurality of image frames.

2. The image processing system according to claim 1, wherein
the at least one processor is configured to process the instructions to control the image processing system to:
learn a parameter to be used for the detection model for detecting the vehicle by performing one or more convolution calculation by using a value of a background model of a neighboring region of the one or more pixels.

3. The image processing system according to claim 2, wherein
the at least one processor is configured to process the instructions to control the image processing system to:
learn, as the parameter, a threshold compared with a value obtained as a result of the one or more convolution calculations.

4. The image processing system according to claim 1, wherein
the first background model is generated based on the plurality of image frames,
wherein in the second background model, an influence of the plurality of image frames is smaller than that of the first background model, and
wherein in the third background model, an influence of the plurality of image frames is smaller than that of the second background mode.

5. An image processing method performed by at least one computer, the method comprising:
receiving an input to place a plurality of first icons that correspond to a vehicle and to place a plurality of second icons that correspond to other than the vehicle on one or more pixels for each of a plurality of image frames comprising an image; and
generating learning data to train a detection model for detecting the vehicle based on the placement of the plurality of first icons and the plurality of second icons on the one or more pixels of the plurality of image frames,
wherein the at least one processor is configured to process the instructions to control the image processing system to:
receiving an input to designate an object region or a background region with respect to one or more pixels at random positions in the plurality of image frames, wherein
the detection model is obtained by training three background models using the generated learning data, and these three background models are different from each other in the number of image frames to be processed,
a first background model has the largest number of image frames to be processed, a second background model has the second largest number of image frames to be processed, and a third background model has the smallest number of image frames to be processed,
the method comprises:
calculating a first distance between the first background model and the second background model, a second distance between the second background model and the third background model, and a third distance between the first background model and the third background model for each pixel or unit region of the plurality of image frames;
determining, based on the first distance, the second distance, and the third distance, whether or not the vehicle is shown in a region corresponding to each pixel of the plurality of image frames; and
based on user input specifying whether some pixels in the plurality of image frames are pixels that correspond the vehicle or a pixel that does not show the vehicle, learning parameters for detecting the vehicle in the plurality of image frames.

6. The image processing method according to claim 5, wherein the method comprises:
learning a parameter to be used for the detection model for detecting the vehicle by performing one or more convolution calculation by using a value of a background model of a neighboring region of the one or more pixels.

7. The image processing method according to claim 6, wherein the method comprises:
   learning, as the parameter, a threshold compared with a value obtained as a result of the one or more convolution calculations.

8. The image processing method according to claim 5, wherein
   the first background model is generated based on the plurality of image frames,
   wherein in the second background model, an influence of the plurality of image frames is smaller than that of the first background model, and
   wherein in the third background model, an influence of the plurality of image frames is smaller than that of the second background mode.

9. A non-transitory computer readable recording medium storing program instructions for causing a computer to perform:
   receiving an input to place a plurality of first icons that correspond to a vehicle and to place a plurality of second icons that correspond to other than the vehicle on one or more pixels for each of a plurality of image frames comprising an image; and
   generating learning data to train a detection model for detecting the vehicle based on the placement of the plurality of first icons and the plurality of second icons on the one or more pixels of the plurality of image frames,
   wherein the at least one processor is configured to process the instructions to control the image processing system to:
      receiving an input to designate an object region or a background region with respect to one or more pixels at random positions in the plurality of image frames, wherein
   the detection model is obtained by training three background models using the generated learning data, and these three background models are different from each other in the number of image frames to be processed,
   a first background model has the largest number of image frames to be processed, a second background model has the second largest number of image frames to be processed, and a third background model has the smallest number of image frames to be processed,
   the program instructions causes the computer to perform:
      calculating a first distance between the first background model and the second background model, a second distance between the second background model and the third background model, and a third distance between the first background model and the third background model for each pixel or unit region of the plurality of image frames;
      determining, based on the first distance, the second distance, and the third distance, whether or not the vehicle is shown in a region corresponding to each pixel of the plurality of image frames; and
      based on user input specifying whether some pixels in the plurality of image frames are pixels that correspond the vehicle or a pixel that does not show the vehicle, learning parameters for detecting the vehicle in the plurality of image frames.

10. The non-transitory computer readable recording medium according to claim 9, wherein the program instructions cause the computer to perform:
   learning a parameter to be used for the detection model for detecting the vehicle by performing one or more convolution calculation by using a value of a background model of a neighboring region of the one or more pixels.

11. The non-transitory computer readable recording medium according to claim 10, wherein the program instructions cause the computer to perform:
   learning, as the parameter, a threshold compared with a value obtained as a result of the one or more convolution calculations.

12. The non-transitory computer readable recording medium according to claim 9, wherein
   the first background model is generated based on the plurality of image frames,
   wherein in the second background model, an influence of the plurality of image frames is smaller than that of the first background model, and
   wherein in the third background model, an influence of the plurality of image frames is smaller than that of the second background mode.

* * * * *